Feb. 18, 1969     H. S. NEWCOMER     3,428,391
MULTIPLE-PRISM LIGHT DISPERSING UNIT FOR MONOCHROMATORS
Filed Jan. 20, 1964     Sheet 1 of 6
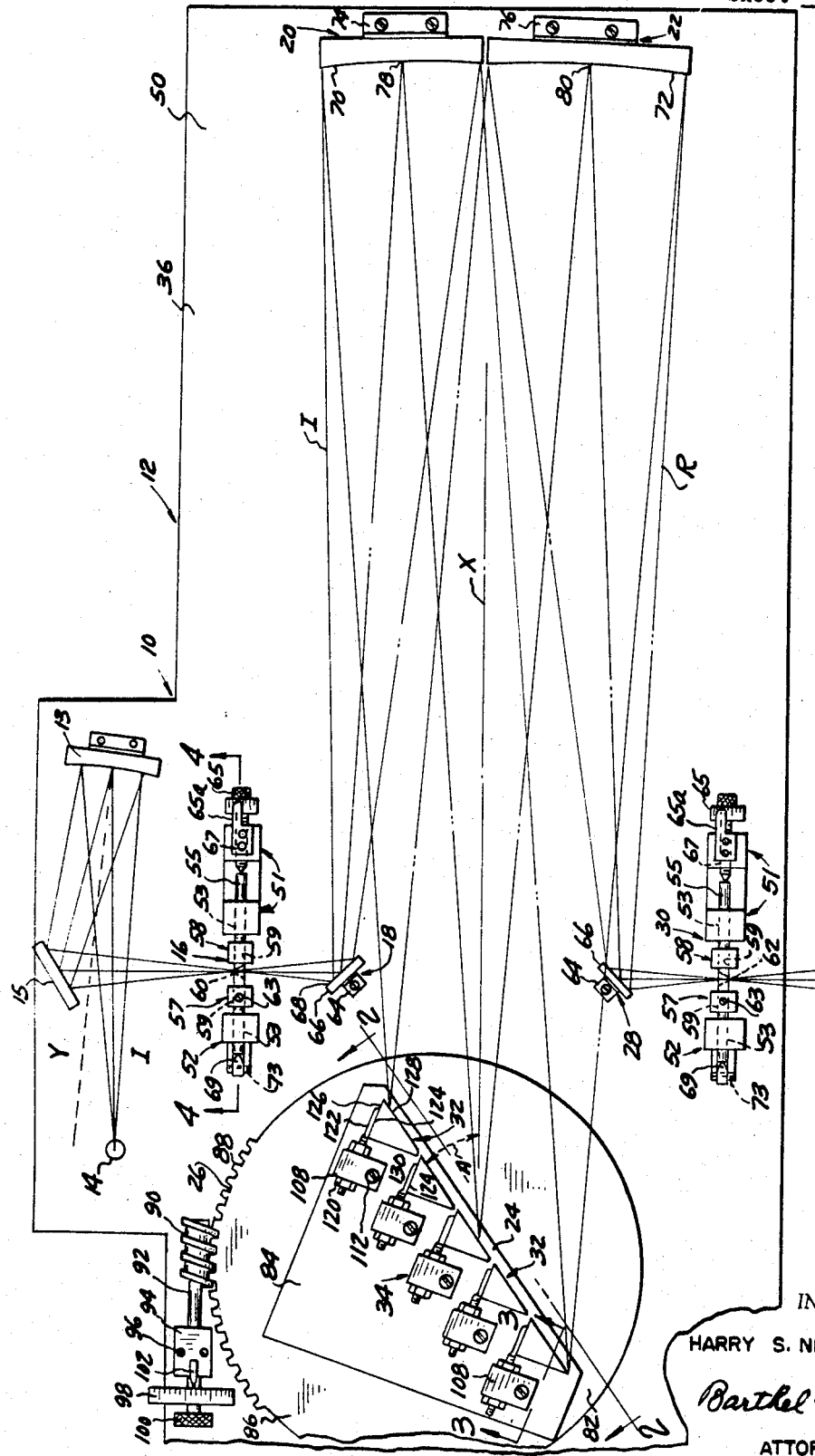
FIG. I
INVENTOR.
HARRY S. NEWCOMER.
Barthel & Bugbee
ATTORNEYS

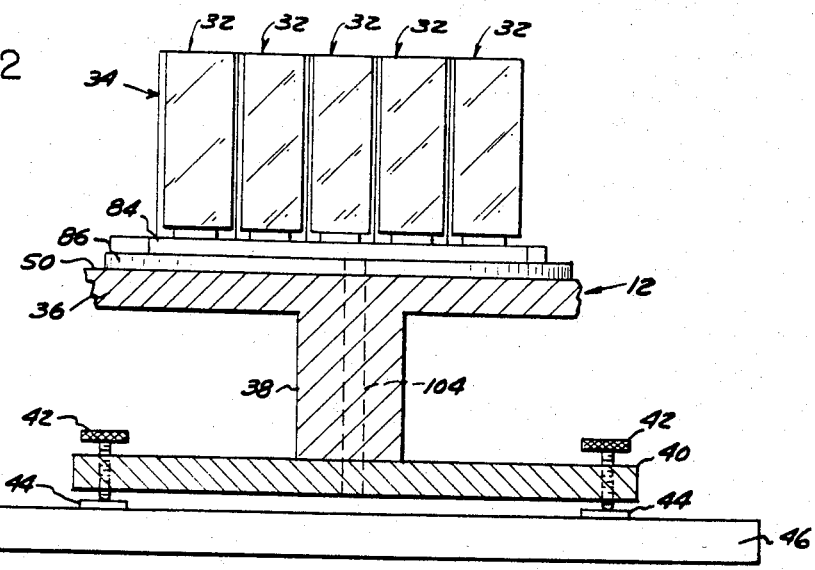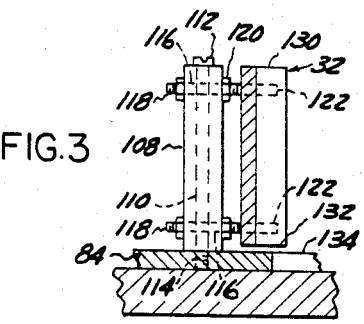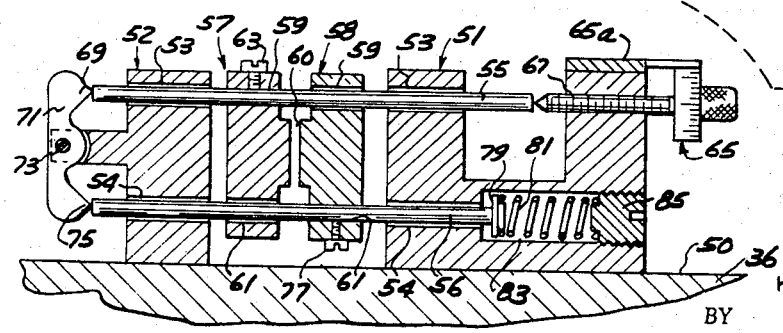

INVENTOR.
HARRY S. NEWCOMER

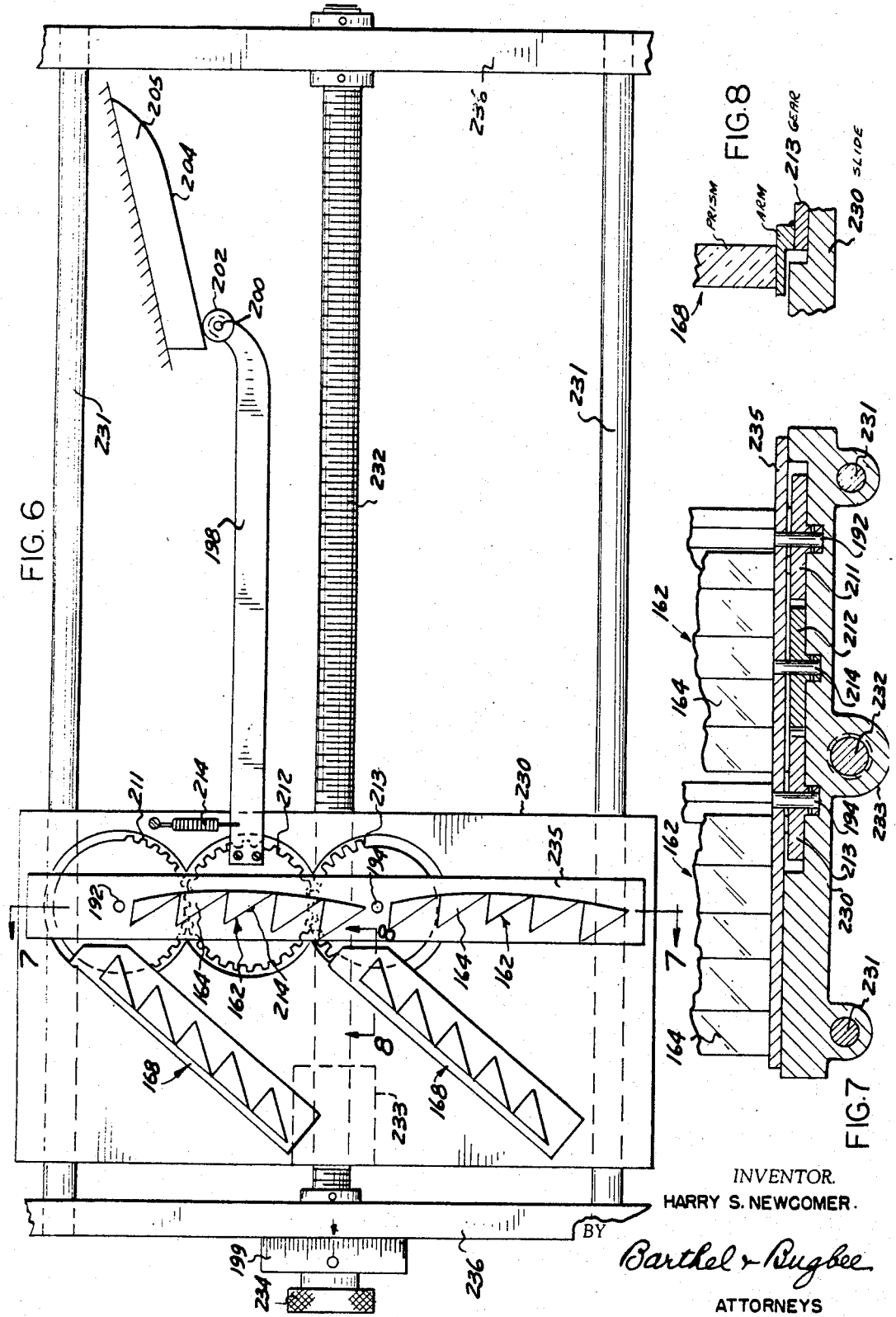

United States Patent Office 3,428,391
Patented Feb. 18, 1969

3,428,391
MULTIPLE-PRISM LIGHT DISPERSING UNIT FOR MONOCHROMATORS
Harry S. Newcomer, P.O. Box 340,
Cape May, N.J. 08204
Filed Jan. 20, 1964, Ser. No. 338,744
U.S. Cl. 350—287                4 Claims
Int. Cl. G02b 7/18

ABSTRACT OF THE DISCLOSURE

This light-dispersing unit (FIGURES 1 to 4) has a rotary mount 26 including a worm wheel turntable 86 carrying a multiple-prism array 24 of 30 degree–60 degree right-angled dispersing prisms 32 mounted with their slant faces 128 preferably approximately co-planar or approximately parallel to one another and parallel to the vertical axis of rotation of the turntable 86. The latter is precisely rotated by a worm 90 on a worm shaft 92 carrying a knob 100 and also a micrometer drum 98 registering with a fixed index pointer 102.

Summary of invention

A monochromator equipped with this light-dispersing unit possesses a greatly increased light flux as compared with prior single-prism monochromators of the same overall width of face, so that a more accurate and revealing study may be made in the region of the spectrum wherein the light flux from the light source is unavoidably low, and wherein the absorption of light in the conventional prior single dispersing prism is unavoidably high because of the excessively long optical length of path of the light rays within the prism.

Each prism of the array of prisms disperses only a part of the light beam from the light source, hence possesses a minimum optical length of light path therein resulting in a minimum absorption of the light flux therein.

The individual prisms of the prism array are individually adjustable as regards their relative positions in approximate coplanar relationship to one another, thereby enabling the correction of the coma normally arising in prior monochromators using spherical collimating mirrors and consequently enabling a great increase in the aperture of the optical system by the use of a wide prism array, the coma correction being largely accomplished by suitable orientation adjustments of the marginal prisms at the opposite ends of the prism array.

The overall cost of the light-dispersing prism system is greatly reduced by the use of this array of multiple relatively small dispersing prisms, in contrast of the single large prior dispersing prism, since the cost of the quartz or other materials used to reduce the absorption of light in the ultra-violet region depends upon its volume, so that the multiple prisms employed in the present monochromator have a much smaller overall volume for an aperture equivalent to that of a single prism monochromator.

In the drawings:

FIGURE 1 is a somewhat diagrammatic or schematic top plan view of a multiple-prism monochromator, according to one form of the invention;

FIGURE 2 is a vertical cross-section taken along the line 2—2 in FIGURE 1;

FIGURE 3 is a vertical longitudinal section taken along the line 3—3 in FIGURE 1;

FIGURE 4 is a central vertical longitudinal section through one of the adjustable slit devices shown in FIGURE 1;

FIGURE 6 is a top plan view showing the mechanical construction of the modified double monochromator shown in FIGURE 5;

FIGURE 7 is a vertical cross-section taken along the line 7—7 in FIGURE 6;

FIGURE 8 is a fragmentary longitudinal vertical section taken along the line 8—8 in FIGURE 6;

FIGURE 11 is a fragmentary top plan view of the monochromator like FIGURE 10 with the slits and slit mirrors mounted on a level below the prism arrays instead of above them.

Figure 5:
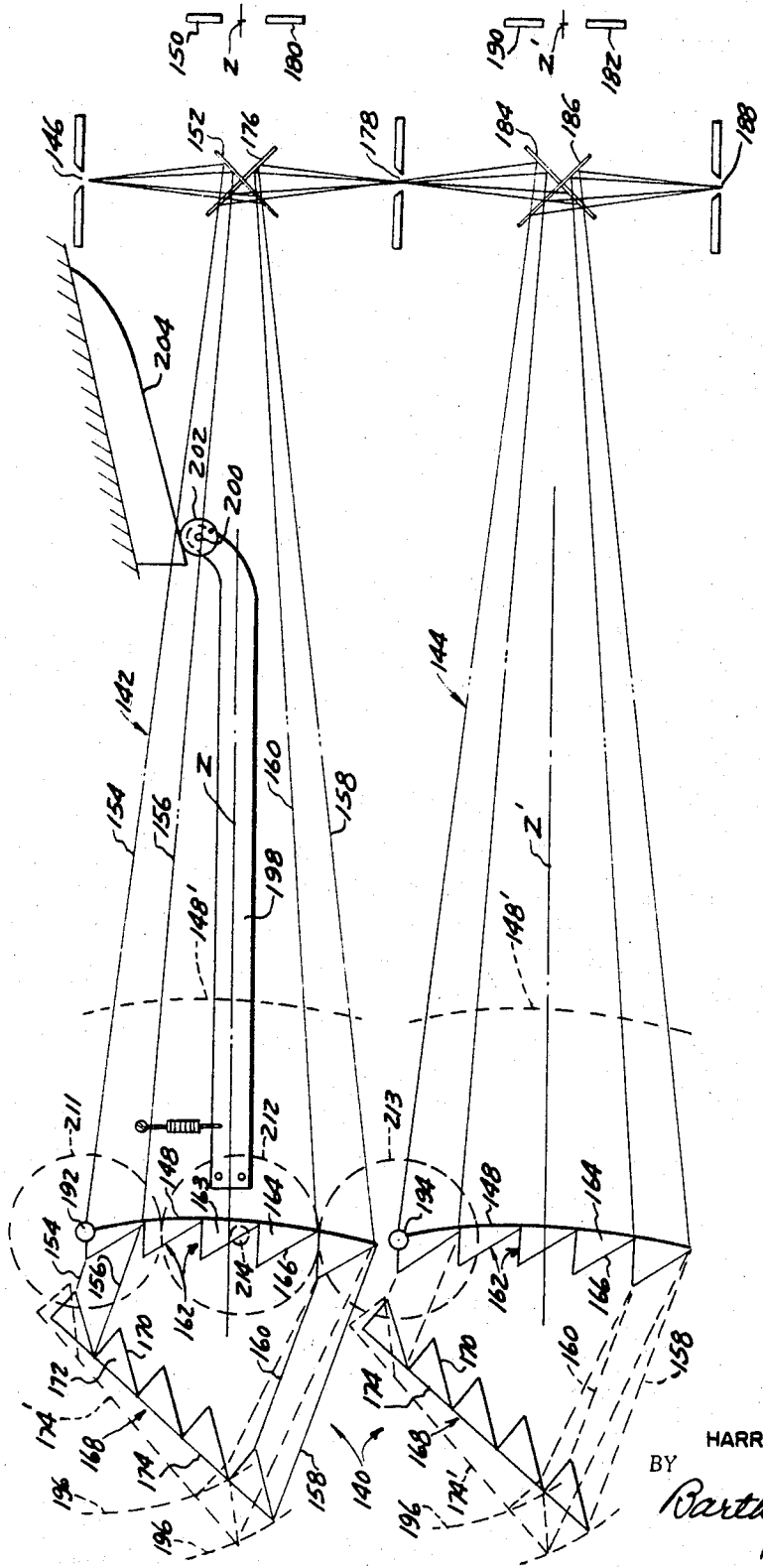
FIGURE 5 is a top plan view of a modified double monochromator illustrated in diagrammatic form to simplify the showing; but employing certain mechanical arrangements similar to FIGURE 1.

Referring to the drawings generally, FIGURE 1 shows a multiple prism monochromator, generally designated 10, which according to one form of the invention may be of the Littrow type in which the dispersing unit, as at 24, is a prism with an apex angle of 30 degrees or thereabouts, which is aluminized on its rear surface to return the incident collimated beam by normal, or nearly normal, reflection for a second refraction and dispersion at the first or incident surface. In the form shown in FIGURE 1, the instrument includes a table-shaped base 12 upon which is mounted a light source 14, a spherical concave front surface condensing mirror 13, a plane surface mirror 15, an entrance slit device 16, an incident beam reflecting plane mirror 18, incident and refracted beam concave collimating mirrors 20 and 22 of rectangular shape, a multiple dispersing prism array 24 in Littrow arrangement mounted upon a precisely-adjusted rotary mount 26, an exit beam reflecting plane mirror 28, and an exit slit device 30. The prism array 24 also generally includes individual dispersing prisms 32 adjustably supported upon individually adjustable prism mounts 34.

Referring to the drawings in detail, the supporting base 12 of the monochromator 10 may assume a variety of forms, the form shown being table-shaped of I-beam section with a flat top plate portion 36 supported upon a vertical web portion 38 which in turn rests upon a plate-shaped bottom portion 40 equipped with levelling screws 42. The lower ends of the levelling screws 42 rest upon and in the usual socket discs 44 which in turn rest upon the usual conventional laboratory table or bench 46. The web portion 38 preferably extends from end to end of the base 12, as do also the top and bottom plate portions 36 and 40 to insure a rigid construction for precise operation. The base 12 optionally is provided with a lateral extension 48 (FIGURE 1) of the top plate 36 for the mounting of the light source 14, and its associate mirrors 13 and 15 which focus its image on the entrance slit, or these may be independently mounted and supported, as desired. The mirror 13 has a radius equal to the length of the light path from it to the light source 14, which length is also equal to the distance from its surface to the slit aperture 60 by way of the plane mirror 15. Alternatively, these distances may be chosen as any other desired conjugate focal distance pair.

The mirror 13 is so inclined that its axis Y bisects the angle between the central or principal rays from the light source 14 before and after reflection from its surface to the center of the plane mirror 15, which in turn directs the beam I to a focus upon the entrance slit aperture 60. The size of the mirror 13 is that of the cross-section of the beam I within the monochromator at an equivalent distance from the slit aperture 60 increased sufficiently to allow for the size of the light source 14 and to cause its image at the slit aperture 60 to fully cover the same in both its length and width. The top plate portion 36 is provided with a substantially flat top surface 50 upon which these and the remaining components of the instrument are mounted. In practice, a box-like housing (not shown) encloses the instrument, with the slit devices 16 and 30 located at its opposite side walls.

The light source 14 may be of any suitable conventional type according to the region of the spectrum being investigated and projected through the exit slit 62. It may, for example, be a hydrogen lamp, a xenon mercury vapor arc or any other suitable light source, according to the circumstances.

The entrance and exit slit devices 16 and 30 respectively are of similar construction, hence a single description will suffice for both. Each consists of two horizontally-spaced vertical posts 51 and 52 mounted in spaced parallel relationship on the top surface 50 of the top plate portion 36. Each of the posts 51 and 52 is provided with vertically-spaced parallel upper and lower horizontal bores 53 and 54 in which are slidably mounted upper and lower rods 55 and 56 respectively. Mounted on the rods 55 and 56 are opposed bevelled slit plates or jaws 57 and 58 containing upper and lower bores 59 and 61 aligned with the bores 53 and 54 and separated from one another by the entrance or exit slit apertures 60 or 62, as the case may be. The jaw 57 is secured as by the set screw 63 in its upper bore 59 to the upper rod 55, which passes loosely through the upper bores 53 in the posts 51 and 52 and loosely through the upper bore 59 of the jaw 58. The upper rod 55 at one end is engaged by a graduated adjusting and indicating thumb screw 65 registering with an index pointer 65a and threaded through a threaded bore 67 aligned with the upper bores 53 in the posts 51 and 52, the post 51 being approximately U-shaped for this purpose. The opposite end of the upper rod 55 engages the upper tip 69 of a rocker arm 71 mounted on a pivot pin 73 supported by the post 52 and at its lower end having a lower tip 75 engaging the adjacent end of the lower rod 56.

The lower rod 56, similar to the upper rod 55, passes loosely and slidably through the lower bores 54 in the posts 51 and 52 and through the lower bore 61 of the jaw 57 and is secured within the lower bore 61 of the jaw 58 by a set screw 77. The opposite end of the lower rod 56 is engaged and urged to the left by a plunger 79 and impelling spring 81 housed in an enlarged counter bore 83 closed at its outer end by a screw plug 85. As a consequence, when the adjusting thumb screw 65 is rotated in one direction or the other, the upper and lower rods 55 and 56 and the jaws 57 and 58 carried by them move toward or away from one another so as to narrow or widen the slit aperture 60 or 62 therebetween.

The entrance and exit beam reflecting mirrors 18 and 28 are also similar to one another. Each consists of a supporting post or mount 64 bolted or otherwise secured to the top plate 36 and carrying a plane front-aluminized mirror plate 66 with a front-aluminized reflecting surface 68. The aluminizing may actually comprise other highly-reflective films or coatings, as are employed in optical instruments requiring maximum reflectance. The entrance and exit mirrors 18 and 28 are plane mirrors and are so located as to reflect the incident light beam I onto the incident collimating mirror 20, whereas the exit beam reflecting mirror 28 receives the refracted and dispersed beam R from the refracted beam collimating mirror 22 and reflects it into and through the exit slit opening 62.

The collimating mirrors 20 and 22 are front-aluminized spherical concave mirrors with front-aluminized concave reflecting surfaces 70 and 72 respectively mounted on mounts 74 and 76 respectively bolted or otherwise secured to the top surfaces 50 of the top plate 36. It will be understood that adjusting arrangements (not shown) are provided for properly lining up the various mirrors 18, 20, 22 and 28, such devices being known to those skilled in the optical instrument art. The curvatures of the front-aluminized concave spherical surfaces 70 and 72 of the mirrors 20 and 22 and the adjustment of the various mirrors and prism array 24 are such that the incident light rays of the incident beam I emanating from the slit aperture 60 of the entrance slit device 16 are brought sharply to focus at the opening 62 of the exit slit device 30. This imagery of the slit opening 60 of the entrance slit device 16 is sufficiently satisfactory in a vertical plane for the usual heights of slit openings if the imagery is satisfactorily obtained in the above manner in a horizontal plane, namely in plan.

As briefly stated, the opposite end prisms 32 of the prism array 24 are individually adjusted relatively to the intermediate prisms 32 so as to overcome or at least satisfactorily reduce coma. In view of this capability or correction of coma arising from the spherical concave mirrors 20 and 22, the present invention enables the use of an increased mirror aperture by enabling an increase in the widths of the mirrors 20 and 22 and, in order to fully encompass the refracted beam R, there is also made possible an increase in the relative width of the refracted beam collimating mirror 22 over that of the incident beam collimating mirror 20. For these reasons, the present invention enables the width of the mirrors 20 and 22 to be brought up to the maximum opening or aperture presented to them by the overall or combined widths of the slant faces of the dispersing prisms 32. As a result, the refracted beam collimating mirror 22 can be made approximately 20% wider than the incident beam collimating mirror 20, the latter being in the position more nearly normal to the prism array 24 than the incident beam collimating mirror 20. The centers 78 and 80 of the spherical concave reflecting surfaces 70 and 72 of the collimating mirrors 20 and 22 are arranged equidistant from the axis X of the system, thereby equalizing and minimizing the off-axis imagery aberrations.

The slant faces of the dispersing prisms 32 of FIGURE 1 are preferably, though not mandatorily, co-planar, i.e., arranged in a common plane 82, or they may be arranged slightly forward or backward of a comman plane. In FIGURE 1, this common plane 82 is disposed at an angle A to the axis X of the system coresponding to a light wave length of 2000 angstrom units for the refracted beam R, as imaged in the exit opening 62, when using quartz dispersing prisms 32. For longer wave lengths, this angle A becomes more obtuse and consequently the maximum useful mirror aperture becomes greater. When using prisms of higher index of refraction than quartz, this angle A becomes more acute and consequently the maximum useful mirror aperture becomes correspondingly smaller. The prisms 32 are 30-degree half prisms, replacing the single large 30-degree half prism used in prior instruments of the Littrow type.

The adjustable prisms mounts 34 for the dispersing prisms 32 in the prism aray 24 are bolted or otherwise secured to a prism array carrier plate 84 (FIGURE 1) which in turn is bolted or otherwise secured to a rotary worm wheel disc or turntable 86 having peripheral teeth 88 engaged by a worm 90. The worm 90 is mounted on a worm shaft 92 journaled in a bearing post or block 94 which in turn is bolted or otherwise secured at 96 to the top plate 36 of the base 12. Mounted on the worm-shaft 92 is a graduated micrometer drum 98 rotated by a knurled head 100. Registered with the micrometer drum 98 is an index pointer 102 mounted on the bearing post 94. The worm wheel disc 86 is rotatably mounted on a vertical shaft 104 (FIGURE 2) journaled in the base 12. The location of the axis of rotation of the shaft 104 is not critical, and the location of the prism array carrier plate 84 may be shifted slightly relatively to the shaft 104 from the position shown in FIGURE 1.

Each prism mount 34 (FIGURES 1 and 3) consists of a post 108 of approximately the same height as the prism 32 which is in turn of about the same height as the square mirror 20. The post 108 contains a vertical bore 110 which receives an anchoring screw 112 threaded tightly into a threaded hole 114 (FIGURE 3) in the mounting plate 84. Each post 108 in a vertical plane offset laterally from the vertical bore 110 is provided with two vertically-spaced horizontal bores 116 which slidably receive adjusting screws 118 carying lock nuts 120 on opposite sides of the post 108. The screws 118 have shank extensions 122 (FIGURE 1) with flat side surfaces 124 cemeted or otherwise secured as by a layer of bonding material to the base surface 126 of the prism 32, the slant surface 128 of which receives the light rays at their initial and final refraction with internal reflection at the altitude surface 130, which is aluminized for internal reflection at that surface 130.

The lock nuts 120 serves to hold off the prism 32 from its respective supporting post 108 so as to leave it hanging free in space. By moving one or the other of the screws 118 by rotating their respective nuts 120, the angle of inclination of the slant surface 128 of each prism 22 can be quickly and securely adjusted while the operator observes the image of the entrance slit aperture 60 in the exit slit aperture 62. On the other hand, by a slight rotation of the posts 108 of the end prisms 32 around the vertical axes of their anchoring screws 112, the end prisms 32 will have been moved out of a true co-planar relationship. Thus, the exit slit image alignment can be rapidly secured and the coma correction described above performed. In actual practice, after the foregoing adjustments have been made and the best imagery obtained, and the best overlapping of the images arising from beam portions due to each prism so obtained, a layer of suitable bonding material is applied to the top surface 130 of each prism 32 and a plate (not shown) laid over the bonding layers to bind the prisms 32 to the top plate (not shown). Similarly, the bonding material may also be injected into the space betwen the bottom surface 132 of each prism 32 and the top surface 134 of the prism carrier plate 84 to similarly secure the adjusted prisms 32 against displacement from their most optically efficient positions.

In the prism array 24 of the present invention, the three intermediate prisms 32 are equivalent to the approximate width of the slant face of a single 30 degree half prism used in prior monochromators of the Littrow type. This size of slant face is limited because of the limited maximum aperture of the spherical collimating mirrors capable of being used in such prior instruments, namely about $f/6.2$, by reason of the fact that such mirrors introduce coma which at larger apertures produces an unacceptably poor quality of imagery of the entrance slit 60 at the exit slit 62. Because of the capability of correcting coma according to the present invention, the addition of the two end prisms 32 to the array increases the permissible aperture of the collimating mirrors 20 and 22 to about $f/5.2$, a 40% gain in light flux.

Moreover, the increased optical length of light path within a single large prism of prior monochromators becomes increasingly longer as its slant face is increased in width, resulting in a corresponding logarithmic increase in light absorption as well as a geometrical increase in volume and cost of the prism. The increase in the cost of the prism is in proportion to the square of the width of the prism. In contrast to this, the use of multiple small prisms in a prism array according to the present invention reduces the optical length of light path required within an equivalent large single prism. Furthermore, the addition of the two end prisms 32 increases the maximum usable mirror aperture for acceptable imagery and also enables the correction of coma. Experience in the use of the present monochromator has shown that it is a comparatively simple procedure, during assembly of the prism array 24, to change the orientation of the individual small prisms 32 to bring the slit image of a spectral line for each small prism into superposition at the exit slit 62. The necessary orientation of the small prisms 32 for such accomplishment can be calculated in advance from the coma values and the individual prisms 32 of the prism array 24 oriented in the calculated positions by contacting them upon a glass plate or other suitable figured surface and then embedding them from the rear in plaster of Paris or other fixation material so as to permanently fix their relative positions as a unit after the glass plate has been removed.

In my illustrated example of FIGURE 1, with five equal small prisms 32 substituting for one large prism with the same overall face, the average length of the light path within the single large prism of prior monochromators of rays is five times that of the average path length for rays traversing the small prisms 32. In the example, if the entrance face of the prism of the single prism monochromator is 66 millimeters long, the average path length in and out of the prism is 36 millimeters, whereas the average path in the prisms 32 is 7½ millimeters, allowing for a ½ millimeter apex thickness in each case. If we assume an extinction coefficient for UV grade fused silica at 2000 angstrom units of 0.10 per centimeter, then in an instrument according to my invention there is a light loss at 2000 angstrom units of only 16% by prism absorption (transmission 84%), whereas the conventional size and shape prism of the single prism monochromator would show an extincition coefficient of .36 or 56% (44% transmission for the average path). This is a significant difference and becomes even more important if cheaper grades of quartz are to be used or if measurements further in the ultraviolet are to be made where an increased extinction constant must be accepted even with the best available materials.

In the monochromator of the present invention, the increased light flux obtained in spectral regions were decreased light flux from absorption in the prism material is a serious factor, outweighs any disadvantage of reduced resolving power due to multiple prisms of small base length. In such spectral regions with prior single-prism monochromators it has been the practice to open up the slits 60 and 62 wide so as to increase the light flux, notwithstanding the loss in spectral purity resulting from the consequent broadening of the spectral band width. Due to the increased light transmission within the prism array 24 of my invention, the necessity for such widening of the entrance slit 60 can be greatly reduced but in any case the slit width which would need to be employed in practice for light flux measurements is wide enough to overcome any disadvantages of decreased resolution.

While five prisms 32 have been shown in the drawings and described herein, the number may be greater or less than five according to the results desired. The invention is not limited to use of quartz nor to a catadioptric imaging system as employed in the collimating mirrors 20 and 22 nor to other catadioptric imaging systems such as one employing a single spherical mirror or parabolic mirror with its focal point above or below the prisms, as in FIGURE 10. The invention is also not limited to the Littrow type half prism 32 shown in the drawings for illustrative purposes only, since the present invention may as well employ an array of small equilateral prisms in place of the single large equilateral prism used in a conventional spectrometer. The invention may also be applied to plural or multiple arrays following one another to increase dispersion, as described more fully below (see FIGURES 5, 9 and 10).

Moreover, the invention is not limited to the particular fastening and orienting means for the prisms 32 shown in FIGURES 1 and 3, as each prism 32 may be bonded to a small flat plate fastened to the side of the post 108 by screws passing through oversized holes in the plate permitting the necessary slight adjustment.

In the operation of the monochromator of the present invention, let it be assumed that the foregoing adjustments have been made and that a satisfactory image of the entrance slit 60 is obtained at the exit slit 62. To obtain the passage of any desired wave length of the spectrum within the transmitted range for the particular material of the prisms 32 of the prism array 24, the operator rotates the knob 100 and the micrometer dial 98, consequently rotating the worm shaft 92 and worm 90 so as to rotate the turntable 86. This action causes the swinging of the prisms 32 resulting in a corresponding shift in the spectral lines or bands of different wave lengths passing through the exit slit 62.

In operation, the incident light rays I from the light source 14 pass through the entrance slit aperture 60 as if originating therein are reflected off the plane mirror 18 onto the incident collimating mirror 20, thence as a beam of parallel rays onto the slant faces 128 of the individual prisms 32 of the prism array 24. The light rays are refracted at the front or slant surfaces 128 of the prisms 32, reflected from their aluminized rear surfaces 130 to again traverse the interior of the prism, and are further dispersed by refraction on leaving the plant surfaces 128 of the prisms 32. The dispersed beam of rays of separate wave lengths is again reflected at the front surface 72 of the refracted beam collimating mirror 22 and thence from the plane mirror 28 to focus in and pass through the exit slit aperture 62. As the angle A which the front or slant surface 128 of each prism 32 makes with the axis X of the system varies with the wave length of the light brought to a focus in 62, this angle A is varied by rotating the turntable 86 by means of the knob 100 and worm 90 to obtain any desired wave length of light at the exit slit 62.

Dispersion in the prism array 24 is determined by the well-known Hartmann formula and the prism array used in the present invention does not affect the value of the Hartmann constants. This is in contrast to the behavior of prior spectrometers and monochromators employing a train of several prisms in series, wherein the resulting dispersion is the algebraic sum of the dispersions of the individual prisms. From the exit slit 62 of the exit slit device 30, the rays of the selected wave length pass into the subsequent instrument or equipment which the monochromator has been set up to serve, for example, a photocell sensing device with perhaps an unknown fluid or other optical material interposed whose spectral absorption is to be determined.

A modification of my invention in the form of a double monochromator, generally designated 140, is shown diagrammatically in FIGURE 5. The purpose of the double monochromator 140 is primarily to provide a high dispersion and spectral purity along with a high transmission of light in the far ultra-violet, where all available optical materials begin to absorb light appreciably and where associated systems, light sources and sensing devices are relatively inefficient. Hence, for convenience, its wave length scale is designed to extend toward the visible spectrum only to a wave length of about 3600 angstrom units, where an optical system of glass is satisfactory.

The supporting structure of the double monochromator 140 is similar to that described above in connection with the monochromator 10 shown in FIGURES 1 to 4 inclusive, and has therefore been omitted in order to simplify the disclosure of the modification 140. The double monochromator 140 includes two individual monochromators, generally designated 142 and 144 respectively, disposed side by side and having approximately parallel optical axes Z and Z' respectively. The double monochromator 140 has an entrance slit aperture 146 located at the focal point of an aspheric refracting optical surface 148, 150 being the virtual image of the slit 146 created by the aspheric surface 148 in the plane mirror 152 for a collimated beam within the medium 163 of quartz or other ultraviolet transparent material.

The plane mirror 152 reflects the beam from the entrance slit 146 into the aspheric surface 148, which is a collimating aspheric optical surface and which causes the incident rays 154, 156, 158 and 160 as well as the other rays therebetween, not illustrated, to pass in parallel relationship into a first prism array 162 of the quartz or other ultraviolet transparent medium 163 located behind the aspheric optical surface 148. The first prism array 162 consists of individual prisms 164 whose rear or slant surfaces 166 make an angle of 32.5 degrees (the chosen angle) with the normal to the axis Z of the system 142. After refraction and dispersion by the prisms 164, the emergent rays pass into a second prism array 168 spaced away from the first prism array 162 and located at an angle to the axis Z compatible, for instance, with an index of refraction 1.475 for the quartz or other medium 163 of which the prism arrays 162 and 168 are composed. In the drawing, an index of refraction of 1.475 is shown so that the paths of the refracted rays 154, 156, 158 and 160 shown in FIGURE 5 correspond to the path of a refracted beam having a wave length of approximately 3600 angstrom units. These refracted rays enter the slant surfaces 170 of the prisms 172 of the second prism array 168 and are again refracted in such a manner as to impinge perpendicularly upon the aluminized rear surfaces 174 of the prisms 172. As a result, the rays 154, 156, 158 and 160 are reflected back along their original paths after having been refracted four times in the first and second prism arrays 162 and 168, with a corresponding dispersion.

In order to separate the incident rays from the refracted rays, the plane mirror 152 is placed slightly above the axis Z, and a second plane mirror 176 is placed in the same general location below the plane mirror 152 and below the optical axis Z of the monochromator 142. The plane mirrors 152 and 176 are front surface mirrors and the plane mirror 176 is so positioned as to direct the refracted rays returning from the prism arrays 162 and 168 to a focus at the intermediate slit 178 which is simultaneously the exit slit of the monochromator 142 and the entrance slit of the monochromator 144. The virtual image 180 of the slit 178 created by the aspheric surface 148 and plane mirror 176 appears below the axis Z, so that in elevation the virtual images 150 and 180 of the slits 146 and 178 appear one above the other. Consequently, the rays incident upon the aspherical surface 148 and the collimated refracted rays thereof have a slightly downward inclination to the axis Z, namely about two degrees in this particular instrument, and the return beam of rays after reflection at the rear surfaces 174 of the prisms 172 of the second prism array 168 are again inclined slightly downward. Accordingly, the entrance slit 146 is located a small distance above the axis Z and the intermediate slit 178 is located below that axis by the same amount.

The second monochromator 144 has the intermediate slit 178 at its entrance slit and light source and otherwise has the same optical components and the same construction as the first monochromator 142, and consequently designated by the same reference numerals. The virtual image 182 of the intermediate slit 178 produced by the second monochromator 144 in the third front surface mirror 184 is located, in elevation, below the axis Z'. The refracted rays after their quadruple refraction in the first and second prism arrays 162 and 168 of the second monochromator 144 and with reflection at the aluminized rear surfaces 174 thereof are reflected at the fourth front surface plane mirror 186 so as to produce an image of the slit 178 in the third or exit slit 188, the virtual image 190 of which is shown in elevation above the axis Z' at the right of FIGURE 5. As before, the front surface mirror 184 is located, in elevation, below the axis Z'. The front surface mirror 184 is located slightly below the axis Z' with just enough seperation between them for the passage of the rays. Thus, the double monochromator 140 of FIGURE 5 employs a quadruple prism array wherein the aspheric surfaces 148 constitute the front surfaces of the prisms 164 of the first prism array 162. For the minimum absorption in the far ultra-violet, the prisms 164 and 172 of the present monochromator 140 are of ultra-violet grade quartz or of synthetic quartz crystal.

Thus, in the first and second monochromators 142 and 144 of the double monochromator 140, collimation for prism passage is secured by a dioptric or refracting system, as contrasted with a catadioptric or reflecting system. As a consequence, the focal length of the collimating surface 148 varies with the index of refraction of the medium 163, namely with the wave length of the refracted beam of rays under study. The double monochromator 140 is designed to operate into the far ultra-violet down to a wave length of about 1800 angstrom units at which quartz has an index of refraction of about 1.58. The dotted lines 174′ indicating the shifted alumnized rear surfaces 174 of the prisms 172 of the second prism array 168 in FIGURE 5 and the consequent dotted positions of the rays acted upon by them indicate the positions corresponding to such an index of refraction of 1.58 in the far ultra-violet. In order to compensate for the difference in refractive indices for the extremely short wave length, the second prism arrays 168 must therefore be shifted to the dotted line positions shown in FIGURE 5, and thus shifting is continuous as intermediate wave length positions are traversed.

The necessary change in inclination to the axis of the second prism array 168 for the extremely short wave length in the far ultra-violet as shown by the dotted lines 174′ is accomplished by rotation of each array 168 around a mechanical axis or shaft 192 for the first monochromator 142 and 194 for the second monochromator 144. These axes of rotation or shafts 192 and 194 are situated approximately at the end of the first prism array 162 in the angle of its front surface 148 and the base of the end prism 164. Arcuate lines 196 indicate the paths of this annular displacement of the second prism arrays 168. The two prism arrays 168 are mechanically interconnected by gearing coupling their rotation shafts or axes 192 and 194 so that they will move equally in the same direction. This is readily accomplished by the employment of two like gears 211 and 213 (FIGURES 6, 7 and 8) keyed to the shafts 192 and 194 and an intermediate idler gear 212 mounted on a similar shaft 214, to which gear 212 the rearward end of the cam lever arm 198 is bolted. The forward end of the cam lever arm 198 carries an axle 200 upon which a cam follower roller 202 is rotatably mounted. The roller 202 rides upon and rolls along a cam surface 204 of a stationary cam 205 which is traversed when the slide or table 230 carrying the prism arrays 162 and 168 is moved as a whole by an operating screw 232 and wave length drug 199 (FIGURE 6) in the manner described below. The arm 198 is thus swung angularly at the proper rate to rotate the idler gear 212 and consequently to rotate the shaft 194 of the second monochromator 144 as well as the shaft 192 of the first monochromator 142 coupled therewith. The cam lever arm 198 is retracted by a tension spring 214 anchored to the table 230. This arrangement swings the prism arrays 168 automatically so that after reflection at the surfaces 174 (FIGURE 5), the light rays for which the wave length drum 199 FIGURE 6) is set are returned over the proper path, the same as that of the incident ray paths 154, 156, 158, 160, except for a slight vertical angular displacement due to the above-axis and below-axis positions of the corresponding slit images shown at 150, 180 at the right-hand end of FIGURE 5.

In order to compensate for the shorter focal length of the collimating surfaces 148 of the prism arrays 162 as the index of refraction of the medium 163 increases with decrease in wave length of the refracted beam passing the instrument, means is provided for moving the entire system of prism arrays 162, 168 forward to a limiting position, as shown by the dotted line positions 148′, corresponding to the extreme angular displacement position of the arrays 168 as shown for their rear surfaces at the dotted lines 174′. By this means, the beams originating in the slits 146 and 178 for the second monochromator are kept collimated in the medium 163 as wave length settings of the arrays 168 are changed. This motion is of course continuous as the wave length scale of the wave length drum 199 is traversed, the extreme positions as drawn being for a fused quartz index of 1.475 and 1.580 respectively corresponding to wave lengths 3650 angstrom units and 1800 angstrom units or thereabouts.

Such shifting is accomplished by mounting the arrays 162, 168 on the slide or table 230 slidably mounted on parallel rods 231 and carrying a nut 233 driven by the screw shaft 232 rotated by a knob 234 connected to the graduated indicating wave length drum 199. The arrays 162 are secured as described below to a bar 235, itself secured to the table 230. The rods 231 are mounted on frame cross members 236 in which the opposite ends of the screw shaft 232 are journalled and one of which carries an index pointer 237 for the wave length drum 199. The movable arrays 168 are secured in the manner described for the prism array 24 of FIGURE 1 to the bar or plate 175 which is fastened in each case to the gear 211 or 213 having an axle 192 or 194.

The operation of the double monochromator 140 of FIGURE 5 is generally similar to that of the monochromator 10 shown in FIGURES 1 to 4 inclusive and differs in the respects described immediately above in connection with the monochromator 140. The prism arrays 168 can be mounted as in FIGURE 3 or as otherwise described above, and in case it is desired to employ a spherical rather than aspherical configuration for the surface 148, the consequent slit image aberration due in this case to spherical aberration can be corrected by slight outward rotation of the end prisms of the arrays 168, as was done, for instance, for the end prisms of the prism array 24 (FIGURE 1) when the posts 108 of the end prisms 32 were turned slightly outward about their screws 112 to secure coma correction for the monochromator 10.

The prisms arrays 162 pass light clear through them and consequently cannot be mounted as readily as in the manner of the prisms 32 of FIGURE 3. However, inspection of FIGURE 5 will reveal that there is room at the blind base of each prism 164 for the positioning of a supporting means securing the individual prism by its base similar to the vertically oriented bar 122 of FIGURES 1 and 3 secured in adjustable fashion to the movable prism bases 175 bolted to the gear 211 and 213 (FIGURE 6). A satisfactory means of securing the prisms 164 of the prism array 162 is to place them in a frame whose bottom member is the plate or bar 235 mounted on the table 230 and the top member is a plate (not shown) opposite the bar 235 and lying across the tops of the prisms 164. Pressure is applied by individual set screws onto the top of each prism 164 and their alignment secured either optically or preferably by contacting them to a template (not shown) constituting a female replica of the front surface 148 of each prism array 142. The ends of the prisms are then bonded top and bottom to the framing plates, all as set forth above.

The double monochromator 140 of FIGURES 5 to 8 inclusive, besides its purity of spectrum and high dispersion has a greatly increased light flux efficiency over the conventional double monochromator with four solid 30° or 32½° prisms. Before discussing this marked efficiency in the lower ultra-violet, two other forms or modifications of my invention shown schematically in FIGURES 9 and 10 and having similar advantages as well as certain special advantages to be set forth will be described. They comprise monochromators of special design employing multiple prism arrays according to my invention as set forth in detail above, as well as slit mechanisms and prism array supporting and adjusting means sufficiently detailed above. Therefore, these two forms are shown schematically for purposes of simplification in FIGURES 9 and 10.

Figure 9:
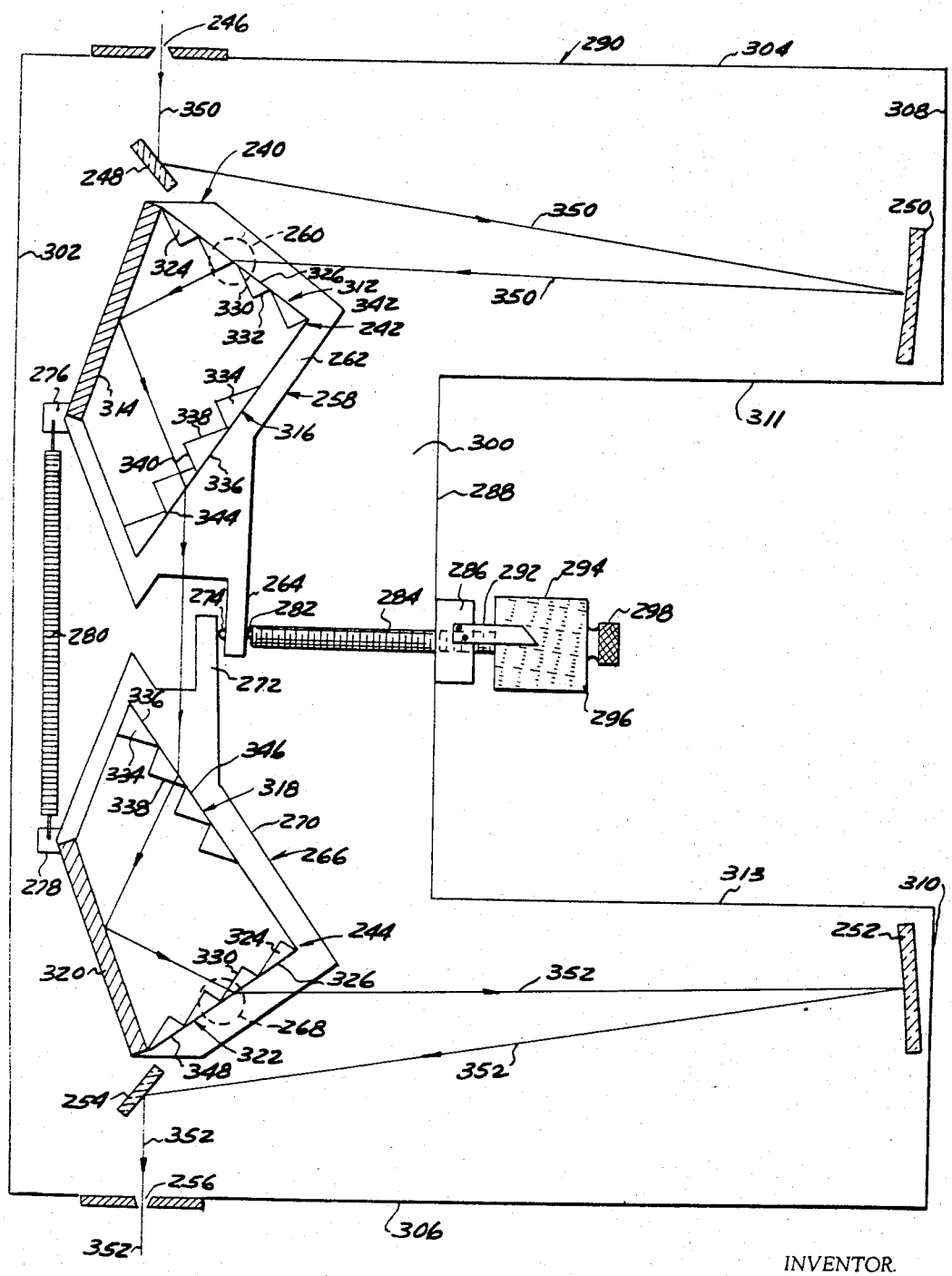
FIGURE 9 is a top plan view of a quadruple-dispersive monochromator also illustrated in diagrammatic form to simplify the showing.

The quadruple dispersive monochromator 240, shown in FIGURE 9 supersedes prior monochromators equipped with two solid Pellin-Broca prisms having roughly the outline and dimensions of the two prism structures shown in FIGURE 9 but employing massive solid prisms. Such prior solid Pellin-Broca prisms have such long optical paths and are so massive as to preclude their use where there is material light absorption or substantial cost of the prism material. In my invention, as shown in FIGURE 9, I replace the two massive solid Pellin-Broca prisms by two paired prism-and-mirror array units, generally designated 242 and 244, situated and oriented adjacent the entrance slit 246 and exit slit 256 respectively. The entrance prism-and-mirror array unit 242 is mounted on a rotary prism table 258 pivoted upon a vertical pivot shaft 260 and having a main table portion 262 approximating the outline of a solid massive Pellin-Broca prism and an arm 264 projecting therefrom toward the opposite or exit prism-and-mirror array unit 244.

The exit prism-and-mirror array unit 244 is mounted upon a similarly-shaped rotary prism table, generally designated 266, pivoted upon a vertical pivot shaft 268 and of similar outline and similarly possessing a main table portion 270 and an arm 272 projecting toward the entrance prism-and-mirror array unit 242 and its table 258 and slightly overlapping its arm 264. Contact between the arms 264 and 272 is made by a contact ball 274 projecting rearwardly from the arm 264. The rotary prism tables 258 and 266 are additionally provided with rearwardly-projecting spring anchorage arms 276 and 278 disposed approximately parallel to one another and drilled to receive the opposite end loops of a tension spring 280. The spring 280 tends to rotate the entrance and exit prism tables 258 and 266 around their respective shafts 260 and 268 in opposite directions toward one another so that the arm 272 is constantly urged into contact with the arm 264 and the arm 264 into contact with the ball point 282 on the inner end of a screw shaft 284 disposed with its axis parallel to the collimated incident beam 350 and passing through a stationary internally-threaded nut 286.

The nut 286 is secured to the main front wall 288 of the monochromator housing, casing or box, generally designated 290, and carries an index pointer 292 registering with the helical graduated wave-length scale 294 on a wave length drum 296 mounted on the outer end of the screw shaft 284 and rotated by means of a knurled knob 298 integral therewith. The monochromator box 290 has a bottom wall 300 in which the prism table pivot shafts 260 and 268 are journalled, a rear wall 302, opposite outer side walls 304 and 306 on which the entrance and exit slits 246 and 256 are mounted, extension front walls 308 and 310, and opposite inner side walls 311 and 313 respectively connecting the extension front walls 308 and 310 to the main front wall 288.

The entrance prism-and-mirror array unit 242 includes an initial prism array 312, an intermediate front surface plane mirror 314, and a final prism array 316, whereas the exit prism-and-mirror array unit 244 similarly includes an initial prism array 318 similar to the final prism array 316, an intermediate front surface plane mirror 320 and final prism array 322 similar to the initial prism array 312. Each initial prism array 312 and final prism array 322 consists of individual 30° right-angle prisms 324 having slant faces 326 and altitude faces 330 disposed at right angles to base or blind faces 332. Similarly, the final prism array 316 and initial prism array 318 include individual 30° right-angle prisms 334 having slant faces 336 and altitude faces 338 disposed at right angles to blind or base faces 340. The slant faces 326 of the initial prism array 312 are disposed in a common entrance plane face 342 whereas the slant faces 336 of the final prism array 316 are disposed in a common exit plane face 344. Similarly, the slant faces 336 of the prism array 318 are disposed in a common entrance plane face 346, whereas the slant faces 326 of the prisms 324 in the final prism array 322 are disposed in a common exit plane face 348.

In the quadruple dispersive monochromator 240 shown in FIGURE 9, which is a constant deviation monochromator, the distances of the concave spherical collimating mirrors 250 and 252 from their respective prism-and-mirror array units 242 and 244 are shown shorter than such distances might be in an actual instrument, in order to enable the showing of the parts on a larger scale and to accommodate the instrument within the single sheet of drawings or if parabolic surfaces are used they can be as shown. The entrance and exit slits 246 and 256 have been shown in simplified form rather than adjustable, in order to avoid complicating the showing and duplicating the description already made of the adjustable slits 16 and 30 in FIGURE 1. It will be understood that in practice, such adjustable slits would be employed in the monochromator 240 of FIGURE 9 as in the monochromator 10 of FIGURE 1. The slit mirrors 248 and 254 are mounted on the bottom wall 300 like the slit mirrors 15 and 28 of FIGURE 1. The collimating mirrors 250 and 252 are mounted on the bottom wall 300 similarly to the collimating mirrors 20 and 22 of FIGURE 1.

In the operation of the quadruple dispersive monochromator 240 of FIGURE 9, an incident beam, represented by its principal ray 350, is reflected by the entrance slit mirror 248 and proceeds to the collimating mirror 250 located at its focal distance from the entrance slit 246, when the collimated beam is reflected in parallel rays impinging upon the common face 342 of the initial prism array 312 of the entrance prism-and-mirror array unit 242, refraction at the slant faces 326 of the individual prisms 324 causing them to pass through the altitude faces 330 undeviated by reason of their normal incidence thereon, reflected at right angles at the front surface intermediate mirror 314, and then passing undeviated through the altitude faces 338 of the prisms 334 in the array 316, and refracted and dispersed at the slant faces 336 thereof in their common plane faces 344 so as to emerge at right angles to the incident collimated beam from the collimating mirror 250. The thus-dispersed beam enters the slant faces 336 of the prisms 334 of the array 318 at their common plane face 346, is refracted and dispersed thereby and passes undeviated through the altitude faces 338 of the prisms 334, is reflected at right angles at the front surface intermediate mirror 320, passes at normal incidence through the altitude faces 330 of the prisms 324 of the prism array 322, is refracted and again dispersed at the slant faces 326 thereof aligned in the common plane face 348 and remains collimated and is again reflected at the spherical mirror 252 to be focused onto the exit slit via the mirror 254 and passes through the exit slit 256 as a quadruply-refracted and dispersed beam 352 which is parallel to the incident beam 350.

The configuration of the Pellin-Broca structures 242 and 244 is completely defined by the corner angles which are, beginning at that nearest the slit mirror 248 and reading counterclockwise, respectively 75°, 135°, 60° and 90°. The dimensions of the prism arrays are determined by the aperture of the collimating mirror 250, which is equal to or slightly smaller than that the aperture of the exit collimating mirror 252. The orientation of the units 242 and 244 and the incidence angle between the incident ray 350 and the normal to the common plane surface 342 is a function of the index of refraction of the material of which the individual prisms 324 and 334 of the arrays 312, 316, 318 and 322 are composed for the wavelength of the light being brought to a focus in the exit slit 256. The wave length of the light emergent in the beam 352 is varied by rotating the wave length drum 296 by the knob 298 so as to bring the desired wave length on the graduated wave length scale 294 in alignment with the index pointer 292. The rotation of the knob 298 at the same time rotates the screw shaft 284 within the nut 286, thereby swinging the arm 264 of the prism table 258 and with it the arm 272 of the prism table 266, thus rotating the prism-and-mirror array units 242 and 244 by equal angular increments in opposite directions of rotation around their respective pivot shafts 260 and 268.

Figure 10:
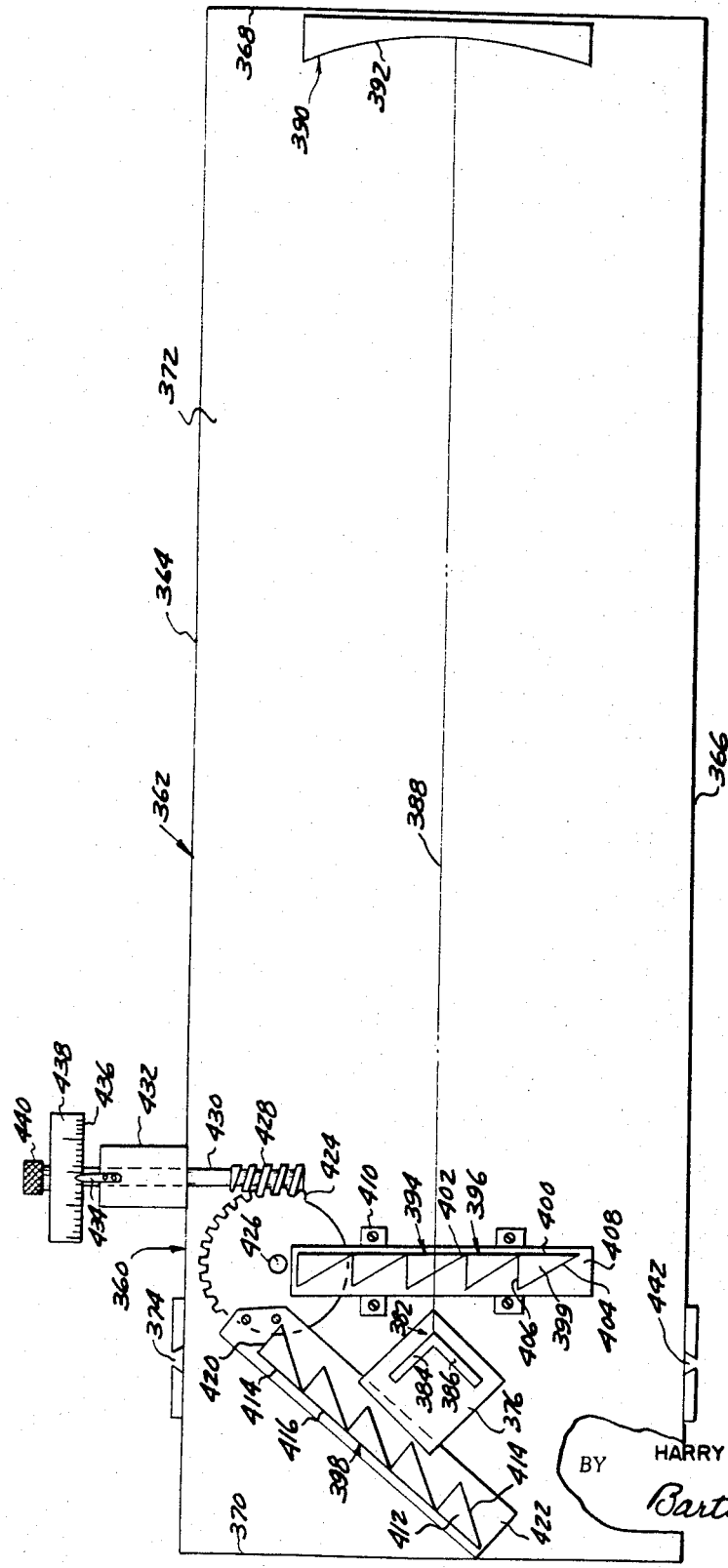
FIGURE 10 is a top plan view of a modified quadruple-dispersive monochromator likewise illustrated in diagrammatic form to simplify the showing.

The further modified monochromator, generally designated 360, shown in FIGURE 10 employs a catadioptric optical system as in FIGURE 1 but requires only one spherical or aspherical collimating mirror placed on the axis of a double prism array. The monochromator 360 is so arranged that two of them may be mounted side by side with the exit slit of one aligned with the entrance slit of the other so as to provide, in effect, a double monochromator. In particular, the monochromator 360 consists of a suitable housing or box 362, shown diagrammatically as consisting of front and rear walls 364 and 366 and opposite end walls 368 and 370 respectively rising from a base or bottom wall 372. Mounted on the front wall 364 is an adjustable entrance slit 374 of the type shown at 16 in FIGURE 1 and shown diagrammatically in order to simplify the illustration. Aligned with the entrance slit 374 in a line perpendicular to the front wall 364 is a slit mirror support 376 disposed in a plane or on a level above the level of fixed and movable prism arrays 378 and 380 respectively. Mounted on the mirror support 376 is a V-shaped front-aluminized plane mirror 382 including an entrance slit mirror 384 and an exit slit mirror 386 disposed at nearly right angles to one another and as near as possible to one another with their reflecting surfaces disposed on opposite sides of the optical axis 388 of the monochromator 360 at angles of 135 degrees each to that axis.

Mounted on the axis 388 remote from the double mirror 382 is a concave front-aluminized collimating mirror 390, the reflecting surface 392 of which has its focus disposed at the entrance slit 374. The mirror 390 is preferably rectangular and of the same size or slightly larger than the prism array, generally designated 396 which it serves. The axes of the entrance and exit slit mirrors 384 and 386 are horizontal and pass through the center of the collimating mirror 390. The mirror 390 is tilted slightly downward to the left, in a typical design 4½° in the vertical plane to the left, so that the collimated beams from its reflecting surface 392 have a downward inclination to the left. in this example 9°, so that they enter the slightly inclined double prism array unit, generally designated 394, and consisting of a fixed array 396 and a movable array 398.

The fixed prism array 396 is made up of individual right-angle prisms 398 having their front or altitude surfaces 400 disposed in the same common front plane 402 and with their slant faces 404 rearward, with their blind faces or bases 406 parallel to one another and, as in FIGURES 5 and 6, constituting the mounting faces of the individual prisms 399. As before, the fixed prisms 399 of the fixed prism array 396 are mounted upon a stationary base bar or plate 408 secured as at 410 to the bottom wall or base 372. The movable prism array 398 is also made up of individual right-angle prisms 412 having their altitude faces 414 aluminized and disposed rearwardly in a common reflecting plane 416. The prisms 412 thus have their slant faces 418 facing forwardly with their base or blind faces 420 parallel to one another. The prisms 412 are mounted in the manner similar to that previously described for the other forms of monochromators disclosed herein upon an elongated plate or prism table 422 which in turn is bolted or otherwise secured to the upper face of a worm wheel 424 mounted for rotation upon an axle or shaft 426 journaled in the bottom wall of the base 372 of the housing or box 362. Meshing with the worm wheel 424 is a worm 428 mounted on the shaft 430 journalled in the bearing 432 mounted on the front wall 364 of the housing or box 362. Bolted or otherwise secured to the bearing 432 is an index pointer 434 which registers with a graduated wave length scale 436 on a drum 438 mounted on the outer end of the worm shaft 430. Integral with the drum 438 is a knurled knob 440 by which the drum 433 is rotated and with it the worm shaft 430 and worm 428. Mounted on the opposite or rear wall 366 of the housing or box 362 is an adjustable exit slit 442 shown as a fixed slit for simplification of disclosure but actually adjustable like the exit slit 30 in FIGURE 1.

The front aluminized surface 392 of the collimating mirror 390 may be either spherical or aspherical. Correction of spherical aberration arising in the large collimating mirror 390 can be accomplished by a slight outward rotation of the opposite end prisms of the movable prism array 398. This is the same correction means as was used for the correction of coma in the monochromator 10 of FIGURE 1 and has the same advantages stated above in connection with FIGURE 1. In the monochromator 360 of FIGURE 10, no translational motion of the prism array unit 394 bodily toward or away from the collimating mirror 390 or vice versa is necessary as in the double monochromator 140 of FIGURES 5 and 6 which employs a curved refracting surface for collimation and consequently requires focusing for wave length.

In the operation of the monochromator 360 of FIGURE 10, a beam of light incident at the entrance slit 374 is reflected at the entrance slit mirror 384 at right angles and proceeds along the optical axis to the collimating mirror 390 where its rays emerge parallel as a result of collimation. The collimated parallel ray beam returns on a path below the optical axis 388 but inclined slightly downward from its incident path before collimation, impinging normally on the common prism array face 402 made up of the aligned individual prism altitude faces 400. There it is dispersed and refracted at the rearward slant faces 404 of the fixed prism array 396 and proceeds beneath the prism support 376 to refraction and dispersion at the front slant surfaces 414 of the individual prisms 412 of the movable prism array 398, as reflected at the aluminized common rear surface 416 made up of the individual prism altitude faces 414, is again dispersed and refracted at the slant faces 414, returns beneath the prism support 376 to the slant faces 404 of the individual prisms 399 of the fixed prism array 396 and emerges normally from the individual altitude faces 400 making up the common prism array face 402 whence it returns to the collimating mirror 390. Hence it is again reflected, passes above the fixed prism array 396 and proceeds to the exit slit mirror 386 where it is reflected at right angles and brought to a focus at the exit slit 442 forming therein a monochromatic image of the entrance slit 374. In this manner, a guadruple refraction andd ispersion is accomplished. Variation of the wave length of the light emergent from the exit 442 is accomplished by rotating the knob 440 and with it the wave length drum 438 until the desired wave length appears under the index pointer 434 on the graduated wave length scale 436. The same action maenwhile rotates the shaft 430 and worm 428 to rotate the worm wheel 424 around its pivot axle or shaft 426 which causes the movable prism table 422 and its movable prism array 398 to swing toward or away the fixed prism array 394 around the axis of the worm wheel shaft 426 as a pivot.

In this manner, the entrance and exit beams have only a small angular separation which is much less than the angular separation of the entrance and exit beams in the monochromator 10 of FIGURE 1. As a result, the return or reflected rays from the aluminized rear surfaces 414 of the prisms 412 of the movable prism array 398 are nearly parallel to the rays incident thereon.

FIGURE 11 shows a monochromator, generally designated 460 which is identical with the monochromator 360 of FIGURE 10 in all respects except that its entrance and exit slits 474 and 542 and their respective slit mirrors 484 and 486 and slit mirror mounting plate 476 are mounted on a level below the prism arrays 396 and 398 with a similar tilting of these relatively to one another for proper optical imagery, instead of on a level above them as in FIGURE 10. Consequently, corresponding parts of the monochromators 360 and 460 are designated with the same reference numerals, except that the parts mentioned above are designated with the same reference numerals increased by 100 to indicate their relationship to one another. The operation of the monochromator 460 of FIGURE 11 is also similar to that described above for FIGURE 10, hence requires no repetition.

The monochromators 360 and 460 of FIGURES 10 and 11 have the advantage of greatly decreased ultraviolet absorption by using small multiple prisms in prism arrays of simple construction as set forth above. The efficiencies of the monochromators 360 and 460 of FIGURES 10 and 11 are therefore far above the efficiencies of prior monochromators with a large single prism or with two such prisms in train.

A numerical comparison will serve to better illustrate the impressive transmission advantages of the prism array instruments of FIGURES 5, 9 and 10. Thus at 2000 angstrom units and an extinction coefficient of 0.1 for a one centimeter layer U.V. grade quartz, the extinction coefficient due to prism absorption for the instrument of FIGURE 5 is 0.328 as against 1.32 for a conventional instrument with four standard solid prisms of the same material. In other words, the prisms of the instrument of FIGURE 5, when made of ultraviolet grade fused silica transmit 47% of the incident light as compared with a 4.8% transmission for the conventional double monochromator with four full solid fused silica prisms. At 1700 angstrom units, the fused silica instrument comparison is 1.53% transmission for the present quadruple array instrument as against 0.000005% transmission for an instrument with four solid standard fused silica prisms. At 1700 angstrom units, and employing the best synthetic quartz crystal the comparison is 47% transmission for the quadruple prism array system of FIGURE 5 as against 4.8% transmission for a conventional double monochromator with four large solid synthetic quartz crystal prisms.

Making similar comparisons with the instrument of FIGURE 10 equipped with two arrays 396 and 398 of multiple fused silicia prisms 399 and 412 as compared with it as equipped with two solid fused silica prisms at 2000 angstrom units, these possess extinctions of 0.164 and 0.66 respectively or transmissions of 68½% and 22% respectively. At 1700 angstrom units, this fused silica camparison becomes 12.4% and 0.0224% transmission respectively. If the best grade synthetic quartz crystal is employed, the comparison at 1700 angstrom units is 68½% transmission and 22% transmission respectively.

Because of the size of the Pellin-Broca prisms and their consequent cost when incorporated in an instrument as shown in FIGURE 9, such a quartz instrument with conventional prisms is hardly practical. The comparison figures for the prism array instrument of FIGURE 9 as against the solid Pellin-Broca prism instrument, using U. V. grade fused silica are 68½% transmission and 16.6% transmission respectively at 2000 angstrom units and 12.4% transmission and 0.0048% transmission respectively at 1700 angstrom units. Using the best grade synthetic crystal quartz the figures would be 68½% transmission as against 16.6% transmission, both at 1700 angstrom units.

In all of the foregoing comparisons it has been assumed that the solid prism substitution would have the same face or aperture, although this would not be practical because of coma unless the collimating means were aspheric. There is at least a 20% advantage here for the prism array. The foregoing advantages for the prism array are impressive either as to relative performance or for equivalent performance at very much reduced cost when the comparison is for the expensive material in the conventional instrument only. The advantages apply to all forms of monochromators as described here and increase as the dispersion of the instrument is increased through complexity of design and particularly as low wave lengths are approached.

In the foregoing specification, the monochromator 10 of FIGURE 1 has been described as having the light travelling from the entrance slit device 16 to the exit slit device 30 by way of the entrance slit mirror 18, the collimating mirror 20, the dispersing prism array 32, the larger collimating mirror 22, the exit slit mirror 28 and the exit slit device 30. The second collimating mirror 22 has been increased in width in comparison with the first collimating mirror 20 so as to prevent any diaphragming of the light beam at the second collimating mirror 22. The present invention also contemplates reversal of the light path in the monochromator 10 of FIGURE 1 by placing the light source 14, concave mirror 13 and plane mirror 15 in a corresponding position in line with the slit 62 of the slit device 30, thereby making the slit device 30 the entrance slit device and the slit 60 the exit slit of the exit slit device 16. In this manner, and by this reversal of the light path, the aperture of the entire optical system and consequently the light flux through the optical system is increased in proportion to the difference in area of the collimating mirrors 22 and 20. In particular, this increase in the light flux by such reversal of the light path amounts to about 20% over the light flux in conventional monochromators or in the arrangement with the direction of the light shown in FIGURE 1.

What I claim is:
1. A light-dispersing unit for a monochromator, comprising
   a prism-supporting structure,
   and a dispersing prism array mounted on said structure,
      said array comprising a multiplicity of individual dispersing prisms mounted side-by-side with substantially flat initially-refracting faces disposed in approximately parallel arrangement, all of said prisms having substantially the same apex angle, the initially-refracting faces of the outermost prisms of the array being disposed in planes angled slightly inwardly toward one another to correct coma arising in the collimating optical system of the monochromator.

2. A light-dispersing unit, according to claim 1, wherein an adjustable prism mount is interposed between each prism and said prism supporting structure, said prism mount having means thereon for adjustably tilting the prism mounted thereon relatively to said prism supporting structure and also relatively to the remaining prisms of said array.

3. A light-dispersing unit, according to claim 2, wherein the prisms include means bonding them to said supporting structure to permanently establish the optimum adjustment thereof.

4. A light-dispersing unit, according to claim 2, wherein said adjustable tilting means effects tilting of the prisms thereon in both horizontal and vertical directions.

References Cited
UNITED STATES PATENTS 3,254,556  6/1966  Staunton _____ 350—286 X

FOREIGN PATENTS 568,324  12/1958  Canada.

JEWELL H. PEDERSEN, *Primary Examiner.*

F. L. EVANS, *Assistant Examiner.*

U.S. Cl. X.R.

88—14; 350—55, 204